INVENTOR.
Ira I. Nelson
BY Morse & Altman
ATT'YS

United States Patent Office 2,879,894
Patented Mar. 31, 1959

2,879,894

WASTE INTERCEPTOR

Ira I. Nelson, Newton, Mass.

Application November 18, 1957, Serial No. 697,098

5 Claims. (Cl. 210—187)

The present invention relates to waste interceptors and, more particularly, to apparatus for separating greasy waste materials from water flowing out of a kitchen sink or the like into a drainage system, from which the greasy waste materials must be excluded in order to prevent blockage.

Objects of the present invention are to provide, as components of a novel waste interceptor through which a waste effluent, e.g. a two phase aqueous and organic fluid, advances for the purpose of trapping the organic phase within the interceptor and transmitting the aqueous phase into the drainage system: a novel valve assembly for simultaneously preventing normal flow of the aqueous phase into the drainage system while ejecting the accumulated organic phase from within the interceptor; a novel heating and deflecting assembly for liquifying the accumulated organic phase and directing it into the aforementioned valve assembly; a novel baffle assembly for causing the organic phase to accumulate in substantially discrete agglomerates which liquify readily; and novel relationships among various components of the valve assembly, the heating and deflecting assembly and the baffle assembly.

Other objects will in part be obvious and will in part appear hereinafter.

The invention accordingly comprises the apparatus possessing the construction, combination of elements and arrangement of parts which are exemplified in the following detailed disclosure, and the scope of which will be indicated in the claims.

For a fuller understanding of the nature and objects of the present invention, reference should be had to the following detailed description taken in connection with the accompanying drawing wherein.

Figures 1, 2, 3, 4:
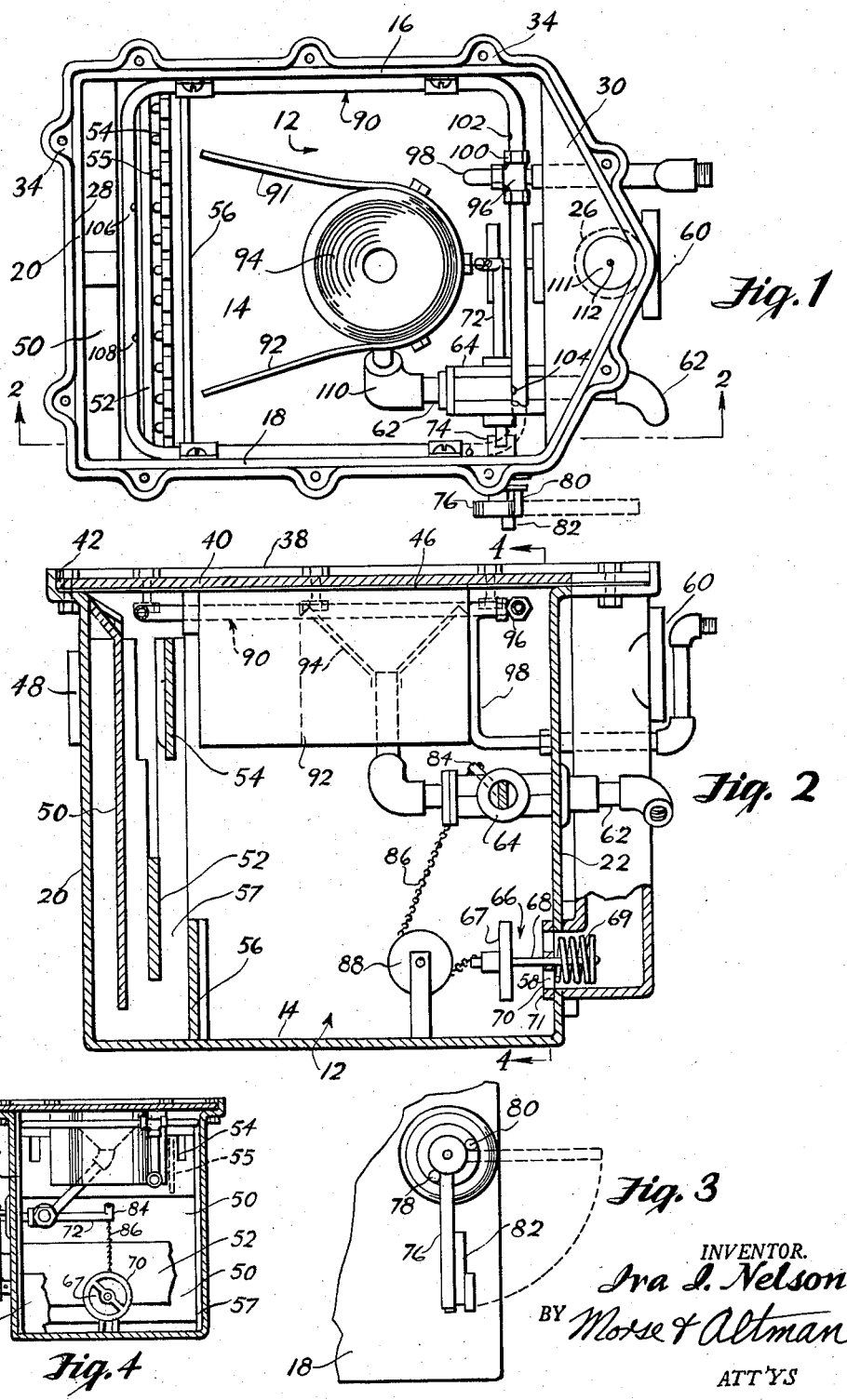
Figure 1 is a top plan view of a waste interceptor of the present invention, its lid being removed to show its internal components.
Fig. 2 is a cross-sectional view, taken substantially along the line of 2—2 of Fig. 1.
Fig. 3 is a fragmentary elevation, taken internally of the waste interceptor of Fig. 1.
Fig. 4 is a fragmentary internal view, taken substantially along the line 4—4 of Fig. 1.

Generally, the operating components of the illustrated embodiment are contained within an open-top cast iron tank having: a main compartment 12 defined by a bottom wall 14, side walls 16 and 18, a rear wall 20 and a front wall 22; and a riser compartment 24 defined by a tubular column 26 (Fig. 2). The free upper edges of walls 16, 18 and 20 are outwardly flanged at 28 and the free upper edge of front wall 22 is forwardly flanged at 30 with a triangular extension projecting over and beyond column 26. Flanges 28 and 30, which are co-planar, are provided with outwardly directed lugs 34 that are centrally apertured. A rim 38 follows the outer boundary of flanges 28 and 30 and of lugs 34. A lid 40, resting on flanges 28 and 30, is provided with centrally apertured lugs 42 that are registered with lugs 34. Extending through the apertures of lugs 34, and lugs 42 are bolts which securely clamp the edges of lid 40 to flanges 28 and 30 with a gasket 46 therebetween.

An aqueous dispersion of greasy waste materials flowing out of a kitchen sink or the like, after entering main compartment 12 through a port 48, is impelled to divide into its aqueous and greasy phases by a mechanical network which tends to cause the greasy phase to float above the aqueous phase in agglomerates of large surface area. This network includes in sequence from left to right: a baffle 50 extending continuously from a region close to lid 40 to a region close to bottom wall 14 in order to direct the incoming fluid downwardly toward the bottom of main compartment 12; a solid guide 52 positioned adjacent bottom wall 14 with its lower edge farther from bottom wall 14 than the lower edge of baffle 50; a comb 54 with upstanding teeth having parallel ribs 55 and free edges that are adjacent lid 40; and a deflector 56. The opposite edges of the components of this network are fitted into the slots of identical flat mounts at the inner faces of side walls 16 and 18, one of these mounts being shown at 57.

Normally, the aqueous phase flows from main compartment 12 through a port 58 at the lower portion of front wall 22 into riser compartment 24. From riser compartment 24, the aqueous phase is directed into the drainage system through a port 60 at the upper portion of column 26. Normal flow of the aqueous phase through the apparatus and accumulation of the organic phase in a layer upon the aqueous phase within main compartment 12 continues until it becomes necessary to remove the accumulated organic matter from main compartment 12.

The organic material is removed from main compartment 12 through a conduit 62 extending through front wall 22. A valve 64, which controls flow through conduit 62, is interconnected with a valve 66, which controls flow through port 58, in such a way that when valve 64 is open, valve 66 is closed and vice versa. As shown, valve 66, which is normally open, includes a solid disk 67 mounted on a reciprocable shaft 68 that is slidable within a bore at the center of a web 71. The disk is pressed by a spring 69 toward a closed position in abutment against a rim 70 bounding port 58. As shown, valve 64 is controlled by a shaft 72 extending therethrough. One end of shaft 72 is keyed to a journal 74 extending through sidewall 18, the outer end of the journal being provided with a control lever 76 pivotable between positions limited by a pair of pins 78 and 80. Normally, lever 76 is in vertical position, as shown in Fig. 3, in which it is locked by a manually engageable latch 82. At the other end of shaft 72 is an arm 84 which is secured to the inner end of shaft 68 by a chain 86 that extends around a pulley 88. When lever 76 is pivoted into its horizontal position to open valve 64, valve 66 is closed.

The organic waste material floating on top of the water in main compartment 12 normally accumulates in the solid or semi-solid state. In accordance with the present invention, this waste is liquified by hot water from a line 90, is directed by vanes 91 and 92 toward a funnel 94 and is directed by funnel 94 through conduit 62 to a container for disposing of the waste material.

Line 90 is a substantially continuous tube extending along walls 16, 18, 20 and 22 at their upper edges. The adjacent ends of this tube communicate with the two oppositely directed openings of a T-coupling 96. The third opening of T-coupling 96 communicates with a hot water input line 98 controlled by a suitable valve (not shown). The opposite ends of line 90 and the inner end of line 98, which are externally threaded and provided with collars (not shown), are joined to T-coupling 96 by internally threaded nuts 100, the outer portions of which are flanged in conventional fashion to abut against the collars. A pair of apertures 102 and 104 in the outer portions of the section of line 90 adjacent to wall 22 and a pair of apertures 106 and 108 in the medial portions of the section of line 90 adjacent to wall 20 are designed to eject hot water that liquifies accumulated waste and directs it into the drainage system in the following manner.

Mounted on the inner end of conduit 62 and communicating therewith is an elbow 110. Carried by elbow 110 and communicating therewith is the nozzle of funnel 94 having a cup, the upper rim of which lies in a plane that is contiguous with the plane of line 90. Extending partially around the cup of funnel 94 and diverging therefrom is an integrally shaped sheet metal section that provides vanes 91 and 92. Accumulated waste is directed by hot water from apertures 102 and 104 along the outer surfaces of vanes 91 and 92 and is directed by hot water from apertures 106 and 108 along the inner surfaces of vanes 90 and 92 into funnel 94.

In normal operation, a waste effluent having aqueous and organic phases flows into main compartment 12 through port 48 and is directed downwardly by baffle 50. As the effluent advances beyond guide 52, comb 54 and deflector 56, the organic phase collects at the upper surface of the aqueous phase. The aqueous phase, minus the organic phase, flows out of main compartment 12 through port 58 and riser compartment 24 from port 60. Although lid 40 and a cap 111 at the head of riser compartment 24, may be removed in order to thoroughly clean the two compartments, or to repair the components therein, normal cleaning proceeds as follows. Normally, lever 76 is in vertical position so that valve 66 is open and valve 64 is closed. When lever 76 is pivoted to horizontal position, valve 66 is opened and valve 64 closed. Now when hot water is introduced to line 90, the waste upon becoming liquified is directed by vanes 90 and 92 into funnel 94 and through conduit 62 to the drainage system. Thereafter, lever 76 is returned to vertical position and normal operation is resumed. Air collecting in main compartment 12, which is sealed by gasket 46 and lid 40, is able to escape between lid 40 and triangular extension 30 through an opening 112 into riser compartment 24 and the drainage system into which it leads.

Since certain changes may be made in the above apparatus without departing from the scope of the invention herein involved it is intended that all matter contained in the above description and shown in the accompanying drawing shall be interpreted in an illustrative and not in a limiting sense.

What is claimed is:

1. A waste interceptor comprising a housing for separating a waste phase from an aqueous phase of a liquid of substantially a predetermined level, said housing providing an input port and an output port for said fluid below said predetermined level, said waste phase tending to float on the upper surface of said aqueous phase at substantially said predetermined level, a funnel including a cup portion with an upper rim substantially at said predetermined level and a conduit portion leading through a wall of said housing, a pair of vanes diverging from said cup, a first valve for controlling flow through said output conduit, a second valve for controlling flow through said conduit portion, said first valve being open when said second valve is closed, said first valve being closed when said second valve is open, and means for introducing hot water into said housing for melting said waste phase and for cooperating with said vanes in order to direct said waste phase into said funnel.

2. The waste interceptor of claim 1 wherein said first valve and said second valve are interconnected by a chain constrained by a pulley.

3. The waste interceptor of claim 1 wherein said means is a continuous tube extending around said housing.

4. A waste interceptor comprising a housing for separating a waste phase from an aqueous phase of a liquid of substantially a predetermined level, said housing providing an input port and an output port for said fluid below said predetermined level, said waste phase tending to float on the upper surface of said aqueous phase at substantially said predetermined level, a funnel including a cup portion with an upper rim substantially at said predetermined level and a conduit portion leading through a wall of said housing, a pair of vanes diverging from said cup, a first valve for controlling flow through said output conduit, a second valve for controlling flow through said conduit portion, said first valve being open when said second valve is closed, said first valve being closed when said second valve is open and a tube extending along the inner faces of said housing at substantially said predetermined level, said vanes being relatively closely spaced from each other in the vicinity of one portion of said tube and being relatively widely spaced from each other in the vicinity of another portion of said tube, said one portion having at least a pair of relatively widely spaced apertures, said other portion having at least a substantially medial aperture.

5. A waste interceptor comprising a housing for separating a waste phase from an aqueous phase of a liquid, said housing providing an input port and a relatively high level and an output port at a relatively low level for said fluid, said waste phase tending to float on the upper surface of said aqueous phase at a relatively high level, means providing a conduit having a mouth at a relatively high level for ejecting said waste phase from said housing, a first valve for controlling flow through said output port, a second valve for controlling flow through said conduit, said first valve being open when said second valve is closed, said first valve being closed when said second valve is open, and means at a relatively high level for introducing water into said housing in order to direct said waste phase into said conduit, a baffle assembly is positioned adjacent to said input port, said baffle assembly including a comb with upstanding teeth having parallel ribs, said first mentioned means including a funnel, the upper rim of said funnel being at a relatively high level, said first valve and said second valve being interconnected by a chain constrained by a pulley, said last-mentioned means being a continuous tube extending around said housing.

References Cited in the file of this patent
UNITED STATES PATENTS

| | | |
|---|---|---|
| 61,880 | Serrell | Feb. 5, 1867 |
| 366,861 | Motley | July 19, 1887 |
| 1,526,197 | Ahlqvist | Feb. 10, 1925 |
| 1,688,807 | Hawley | May 8, 1928 |
| 2,342,950 | Lovelady et al. | Feb. 29, 1944 |
| 2,439,633 | Reinhart | Apr. 13, 1948 |